United States Patent
Krug

(10) Patent No.: US 12,110,983 B2
(45) Date of Patent: Oct. 8, 2024

(54) PNEUMATICALLY CONTROLLED VALVE UNIT, VALVE SYSTEM, AND METHOD OF OPERATING A VALVE UNIT

(71) Applicant: Buerkert Werke Gmbh & Co. KG, Ingelfingen (DE)

(72) Inventor: Uwe Krug, Ingelfingen (DE)

(73) Assignee: Buerkert Werke Gmbh & Co. KG, Ingelfingen (DE)

( * ) Notice: Subject to any disclaimer, the term of this patent is extended or adjusted under 35 U.S.C. 154(b) by 14 days.

(21) Appl. No.: 18/180,564

(22) Filed: Mar. 8, 2023

(65) Prior Publication Data

US 2023/0287988 A1  Sep. 14, 2023

(30) Foreign Application Priority Data

Mar. 9, 2022  (DE) .......................... 102022105565.5

(51) Int. Cl.
  *F16K 31/122*  (2006.01)
  *F16K 24/02*  (2006.01)
  *F16K 37/00*  (2006.01)

(52) U.S. Cl.
  CPC .......... *F16K 31/1221* (2013.01); *F16K 24/02* (2013.01); *F16K 37/0083* (2013.01); *F16K 37/0091* (2013.01)

(58) Field of Classification Search
  None
  See application file for complete search history.

(56) References Cited

U.S. PATENT DOCUMENTS

| 8,191,455 B2 | 6/2012 | Baeuerle et al. |
| 10,378,672 B2 * | 8/2019 | Beck .......................... B05B 1/00 |
| 10,989,326 B2 * | 4/2021 | Rehhoff ................ F16K 31/124 |

(Continued)

FOREIGN PATENT DOCUMENTS

| DE | 102006028015 A1 | 12/2007 |
| EP | 2004428 B1 | 9/2011 |

(Continued)

*Primary Examiner* — Umashankar Venkatesan
(74) *Attorney, Agent, or Firm* — McNees Wallace & Nurick LLC

(57) ABSTRACT

A pneumatically controlled valve unit is specified, having a main valve for controlling a fluid flow of a fluid to be dosed. The valve unit has a piston shiftably mounted in a valve chamber, operating against a return device, and connected to a valve closing body of the main valve to open and close the main valve. The piston delimits a pressure chamber within the valve chamber such that the piston can be shifted against the return device by pressurizing the pressure chamber, wherein a position sensor is provided which is set up to detect the position of the piston in the valve chamber. One respective pressure line leads from the pressure chamber to a pressure fluid port and a ventilation port, wherein an aeration valve is arranged in one pressure line and a ventilation valve is arranged in the further pressure line, and wherein a control unit is provided which is set up to switch the aeration valve and the ventilation valve on the basis of the position of the piston detected by the position sensor to regulate a pressure in the pressure chamber for shifting the piston. Furthermore, a valve system comprising at least one valve unit, and a method of operating the valve unit are specified.

10 Claims, 2 Drawing Sheets

(56) References Cited

U.S. PATENT DOCUMENTS

| | | | |
|---|---|---|---|
| 11,028,941 B2* | 6/2021 | Ferreira | F16K 31/0627 |
| 11,073,442 B2* | 7/2021 | Glime, III | F16K 37/0041 |
| 11,098,822 B2* | 8/2021 | Götz | F16K 37/0008 |
| 11,207,935 B2 | 12/2021 | Harrison et al. | |
| 2008/0277608 A1* | 11/2008 | Marks | F16K 37/0041 |
| | | | 251/129.01 |
| 2009/0205332 A1 | 8/2009 | Baeuerle et al. | |
| 2018/0354333 A1 | 12/2018 | Harrison et al. | |
| 2022/0260177 A1* | 8/2022 | Weilandt | G06N 3/045 |
| 2022/0341441 A1* | 10/2022 | Feinauer | F15B 21/044 |

FOREIGN PATENT DOCUMENTS

| | | |
|---|---|---|
| EP | 3416836 B1 | 9/2022 |
| WO | 2007118674 A2 | 10/2007 |

* cited by examiner

PNEUMATICALLY CONTROLLED VALVE UNIT, VALVE SYSTEM, AND METHOD OF OPERATING A VALVE UNIT

FIELD OF DISCLOSURE

The present disclosure relates to a pneumatically controlled valve unit, to a valve system comprising a valve unit, and to a method of operating a valve unit.

BACKGROUND

It is known to switch pneumatically controlled valve units using an aeration valve and a ventilation valve. The aeration valve supplies a valve chamber with compressed air to open a valve to be switched, as a result of which the pressure in the valve chamber increases and a piston coupled to a closure member of the valve to be switched is moved. The pressure in the valve chamber increases up to a system pressure of a connected compressed-air network. The ventilation valve is opened to close the valve to be switched, such that compressed air can escape from the valve chamber and the pressure in the valve chamber drops to ambient pressure, the piston being thus moved back.

A drawback here is that a large amount of compressed air is consumed, which has an adverse effect on the energetic efficiency of the valve unit.

SUMMARY

Therefore, an object of the present disclosure is to specify a valve unit and a valve system comprising a valve unit, which can be operated in a particularly efficient manner. Furthermore, a method for a particularly efficient operation of a valve unit is to be specified.

According to the present disclosure, this object is achieved by a pneumatically controlled valve unit having a main valve for controlling a fluid flow of a fluid to be dosed, and having a piston shiftably mounted in a valve chamber, operating against a return means, and connected to a valve closing body of the main valve to open and close the main valve. The piston delimits a pressure chamber within the valve chamber such that the piston can be shifted against the return means by pressurizing the pressure chamber. Furthermore, a position sensor is provided which is set up to detect the position of the piston in the valve chamber. One respective pressure line leads from the pressure chamber to a pressure fluid port and a ventilation port, wherein an aeration valve is arranged in one pressure line and a ventilation valve is arranged in the further pressure line. A control unit is further provided which is set up to switch the aeration valve and the ventilation valve on the basis of the position of the piston detected by the position sensor to regulate a pressure in the pressure chamber for shifting the piston.

The valve unit has the advantage to permit a particularly energy-efficient operation in which less compressed air is consumed than in conventional pneumatically operated valve units.

By arranging the control unit to switch the aeration valve and the ventilation valve on the basis of the position of the piston detected by the position sensor, the aeration valve and the ventilation valve may be closed as soon as the piston has reached a final position corresponding to an open state or a closed state of the main valve. That is, the pressure in the pressure chamber does not rise up to the system pressure of a connected compressed-air network upon opening of the main valve, as a result of which a consumption of compressed air is reduced. Similarly, the pressure in the pressure chamber does not drop to ambient pressure when closing the main valve. When the main valve is subsequently opened, accordingly less compressed air is consumed to shift the piston into its open position.

According to the present disclosure, the aeration valve and the ventilation valve may also be integrated into a single valve which combines the functions of an aeration valve and a ventilation valve.

A pressure sensor may be arranged in the valve chamber. The pressure sensor permits an even more accurate switching of the aeration valve and of the ventilation valve by the control unit. For example, the control unit may be set up to switch the aeration valve or the ventilation valve already when the piston is not yet in a final position, but the measured pressure is sufficient to shift the piston further up to the final position against the force of the return means. In this way, a consumption of compressed air can be further reduced. Furthermore, the measured values of the pressure sensor may serve to perform a plausibility check on the measured values of the position sensor.

According to one embodiment, the aeration valve and/or the ventilation valve is a solenoid valve. The aeration valve or the ventilation valve may thus be switched particularly quickly.

For example, the valve unit has an electronic interface for reading out data including a position of the piston and/or a pressure in the pressure chamber. It is thus possible to control a plurality of valve units using one single control unit adapted to read out the required data via the interface. Alternatively, the data can be read out for other purposes. The data may be transmitted to a compressed-air control of a valve system, for example.

The valve unit may have a chamber separate from the valve chamber for accommodating the electronic components. This enables a modular structure of the valve unit.

Furthermore, the object is achieved according to the present disclosure by a valve system comprising at least one valve unit according to the present disclosure, the system comprising a compressed-air supply which is connected to the compressed-air port of the at least one valve unit, and a compressed-air control unit which is set up to regulate a system pressure provided by the compressed-air supply on the basis of a position of the piston and/or a pressure prevailing in the pressure chamber.

The valve system according to the present disclosure has the advantage that the system pressure may be adapted to the requirements of the valve unit. In particular, a system pressure can be lowered if the pressure prevailing in the pressure chamber is permanently below a system pressure. A lower system pressure also leads to energy savings as less compression of the compressed air is required.

A further advantage of the valve system according to the present disclosure is that the pressure supply is strained only to the required load.

The position of the piston in combination with a consumption of compressed air in particular permits conclusions to be drawn about a need of compressed air of the valve unit.

The compressed-air control unit is for example electronically connected to the interface of the valve unit for reading out data. In this way, the data relating to the position of the piston and/or the pressure conditions in the pressure chamber can easily be transmitted to the compressed-air control unit. The compressed-air control unit may in particular continuously monitor the pressure in the pressure chamber.

Furthermore, the object is achieved according to the present disclosure by a method of operating a valve unit according to the present disclosure. In one method step, the control unit drives the aeration valve and/or the ventilation valve so as to shift the piston out of an open position, in which the main valve is open, into a closed position, in which the main valve is closed, or vice versa. The position of the piston is detected by the position sensor. As soon as the piston is in the open position or in the closed position, the aeration valve or ventilation valve is closed.

As already discussed in connection with the valve unit, the consumption of compressed air during operation of the valve unit is thus reduced. More specifically, when the main valve is open, there is no pressure buildup to system pressure, and when the main valve is closed, there is no pressure reduction to ambient pressure.

If the position of the piston differs from an open position or a closed position, while the pressure in the pressure chamber is approximately constant, the aeration valve or the ventilation valve may be reopened temporarily. This allows the piston position to be readjusted.

Approximately constant means that a pressure varies slightly only due to leakage, but not due to an opening of a valve.

BRIEF DESCRIPTION OF THE DRAWINGS

Further advantages and features of the invention will become apparent from the description below and from the accompanying drawings to which reference is made and in which.

DETAILED DESCRIPTION OF EXAMPLE EMBODIMENTS

Figure 1:
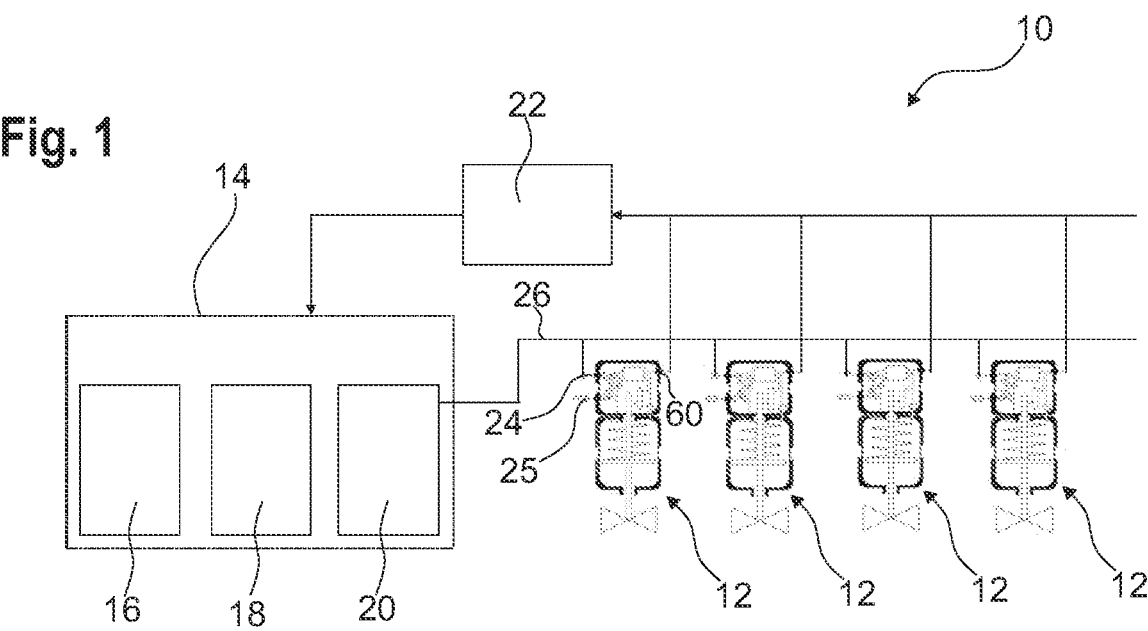
FIG. 1 shows a valve system according to an example embodiment, comprising a plurality of valve units according to an example.

FIG. 1 shows a valve system 10 comprising a plurality of valve units 12. Four valve units 12 are shown in the example embodiment, the number is however not limited.

The valve units 12 are pneumatically controlled valve units. The valve system 10 includes a compressed-air supply 14.

The compressed-air supply 14 comprises a compressor 16, a compressed-air regulation 18 and a compressed-air accumulator 20, which are shown schematically in FIG. 1.

Furthermore, the compressed-air supply 14 comprises a compressed-air control unit 22 which is set up to regulate a system pressure provided by the compressed-air supply 14.

The valve units 12 each have a pressure fluid port 24 and a ventilation port 25.

The compressed-air supply 14 is connected to the pressure fluid port 24 of the valve units 12 to supply the latter with compressed air.

In the example embodiment, the pressure fluid ports 24 of the valve units 12 are fluidically connected to the compressed-air accumulator 20 via pressure lines 26.

Figure 2:
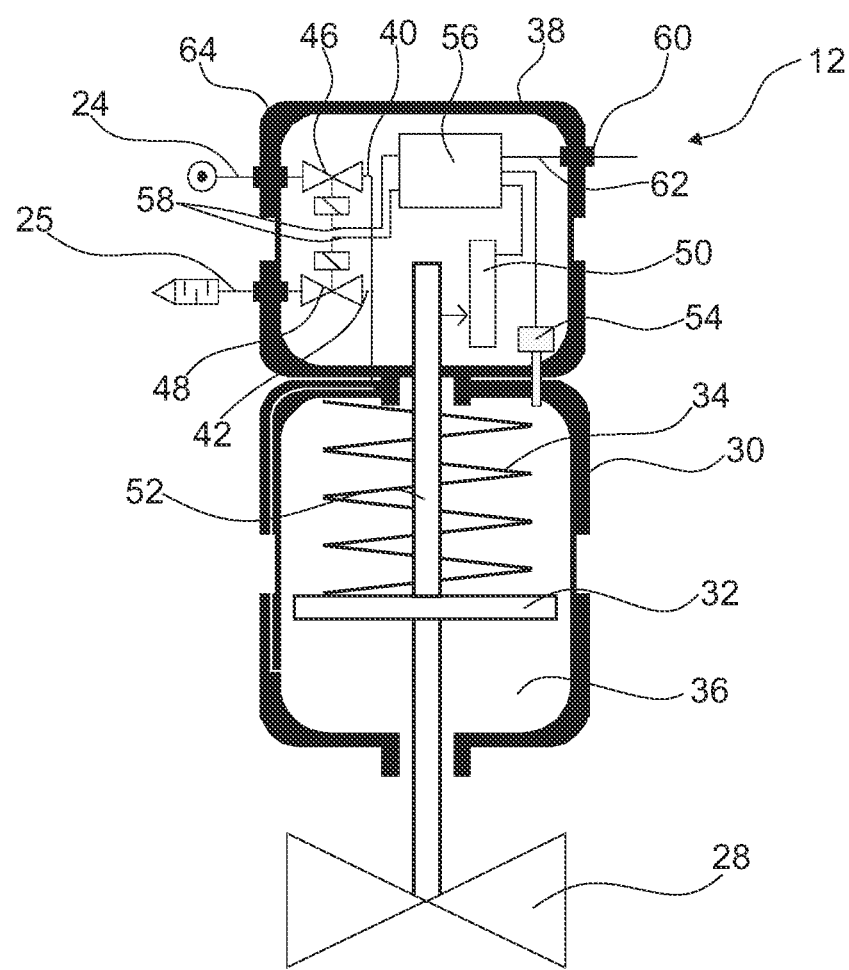
FIG. 2 shows one the valve units according to the example embodiment of FIG. 1.

FIG. 2 shows one of the valve units 12 illustrated in FIG. 1.

The valve unit 12 comprises a main valve 28 for controlling a fluid flow of a fluid to be dosed, which is shown schematically in the figures.

The valve unit 12 has a valve chamber 30 and a piston 32 shiftably mounted in the valve chamber 30.

The piston 32 operates against a return means 34 which is a spring in the example embodiment.

The piston 32 delimits a pressure chamber 36 within the valve chamber 30, so that the piston 32 can be displaced against the return means 34 by pressurizing the valve chamber 36.

The valve unit 12 shown in the example embodiment is a normally-closed valve unit 12. Alternatively, a normally-open valve unit 12 is also conceivable.

The piston 32 is connected to a valve closing body (not shown) of the main valve 28 to open and close the main valve 28.

In addition to the valve chamber 30, the valve unit 12 also has a chamber 38 separate from the valve chamber 30 for accommodating electronic components.

One respective pressure line 40, 42 leads from the pressure chamber 36 to the pressure fluid port 24 and the ventilation port 25.

In the example embodiment, the pressure lines 40, 42 have a common section starting from the pressure chamber 36. However, the pressure lines 40, 42 may also be completely separate from each other.

An aeration valve 46 is arranged in the pressure line 40 leading to the pressure fluid port 24.

A ventilation valve 48 is arranged in the further pressure line 42 leading to the ventilation port 25.

The aeration valve 46 and the ventilation valve 48 constitute pilot valves for controlling the main valve 28.

The aeration valve 46 and the ventilation valve 48 are solenoid valves.

The aeration valve 46 and/or the ventilation valve 48 are for example a 2/2- or a 3/3-way valve.

The valve unit 12 also comprises a position sensor 50 which is set up so as to detect the position of the piston 32 in the valve chamber 30.

The position sensor 50 is for example accommodated in the chamber 38.

To be adapted to detect the position of the piston 32, a plunger 52 connected to the piston 32 protrudes out of the valve chamber 30 and into the chamber 38, so that the position sensor 50 can detect a movement or position of the plunger 52.

The position sensor 50 is a Hall sensor, for example.

The valve unit 12 further comprises a pressure sensor 54 which is arranged at least in sections in the valve chamber 30 to detect a pressure in the valve chamber 30.

Furthermore, a control unit 56 is provided which is set up to switch the aeration valve 46 and the ventilation valve 48 on the basis of the position of the piston 32 detected by the position sensor 50 to regulate a pressure in the pressure chamber 36 for shifting the piston 32.

For this purpose, the control unit 56 is connected to the aeration valve 46 and to the ventilation valve 48 via control lines 58.

In the example embodiment, each valve unit 12 has its own control unit 56 which is accommodated in the chamber 38.

It is however also conceivable to provide a central control unit outside the chamber 38 which may be set up for controlling a plurality of valve units 12.

The valve unit 12 also has an electronic interface 60 for reading out data including a position of the piston 32 and/or a pressure in the pressure chamber 36.

The interface 60 is in particular connected to the control unit 56 via a signal line 62, such that data present in the control unit 56 can be read out at the interface 60.

The control unit 56 is in particular set up to provide the output signals of the position sensor 50 and the pressure sensor 54 at the interface 60.

The interface 60 is provided on a housing 64 of the chamber 38, which is advantageous due to the proximity to the electronic components, in particular the control unit 56.

As shown in FIG. 1, the compressed-air control unit 22 is electronically connected to the interface 60 of the valve unit 12 for reading out data.

The compressed-air control unit 22 is in particular set up so as to regulate a system pressure provided by the compressed-air supply 14 on the basis of a position of the piston 32 and/or a pressure prevailing in the pressure chamber 36.

Based on the position of the piston 32 and/or the pressure in the pressure chamber, the compressed-air control unit 22 may determine which air pressure is required to completely open the main valve 28.

A method of operating the valve system 10 and the valve unit 12 will be described below.

Compressed air is continuously generated in the valve system 10 by means of the compressed-air supply 14. Air is in particular compressed by the compressor 18 and provided in the compressed-air accumulator 20.

The system pressure of a conventional compressed-air supply 14 is usually about 8 bar.

The system pressure is applied to the pressure fluid port 24 in that the pressure fluid ports 24 of the valve units 12 are fluidically connected to the compressed-air accumulator 20 via pressure lines 26.

In case the main valve 28 is to be moved from a closed state into an open state, the control unit 56 drives the aeration valve 46 such that the aeration valve 46 opens.

In the open state of the aeration valve 46, compressed air flows into the pressure chamber 36, as a result of which the pressure in the pressure chamber 36 increases and the piston 32 is shifted against the return means 34 from the closed position into its open position.

For example, the piston 32 starts to move into the open position at a pressure of about 3 bar.

The piston 32 is in the open position at a pressure of 5.5 to 6 bar, for example.

The exact values depend in particular on the rigidity of the return means.

The position of the piston 32 is in particular continuously detected by the position sensor 50.

As soon as the piston 32 is in the open position, the aeration valve 46 is closed.

Due to the early closing of the aeration valve 46, the pressure in the pressure chamber 36 remains at a level of 5.5 to 6 bar, i.e. below the system pressure of 8 bar.

Therefore, the compressed-air supply 14 has to reproduce less compressed air.

The control unit 56 may take the values measured by the pressure sensor 54 into account in addition to the position of the piston 32 upon switching of the ventilation valve 46. The control unit 56 may for example switch the ventilation valve 46 as soon as the pressure in the pressure chamber 36 is 5.5 bar, even if the piston 32 is not yet completely in its open position. However, due to the pressure built-up in the pressure chamber 36, the piston 32 can move up to the open position even after closure of the ventilation valve 46. The compressed-air consumption can thus be further reduced.

To close the main valve 28, the aeration valve 46 is closed and the ventilation valve 48 is opened.

The opening of the ventilation valve 48 causes the pressure in the pressure chamber 36 to drop such that the piston 32 can be moved into its closed position by the return means 34.

The position of the piston 32 is here also detected, in particular continuously detected by the position sensor 50.

As soon as the piston 32 is in the closed position, the ventilation valve 48 is closed.

Due to the early closing of the ventilation valve 48, the pressure in the pressure chamber 36 remains at a level of about 3 bar, i.e. above the ambient pressure of 0 bar.

The consumption of compressed air is thus additionally reduced when the main valve 28 is subsequently opened.

Therefore, the consumption of compressed air can be considerably reduced compared to the conventional systems.

The control unit 56 may also take the values measured by the pressure sensor 54 into account when the main valve 28 is closed, and close the ventilation valve 48 at a pressure of 3 bar, for example.

In case the position of the piston 32 differs from an open position or a closed position, while the pressure in the pressure chamber 36 is approximately constant, the aeration valve 46 or the ventilation valve 48 is temporarily opened. This enables the position of the piston 32 to be readjusted.

Figure 3:
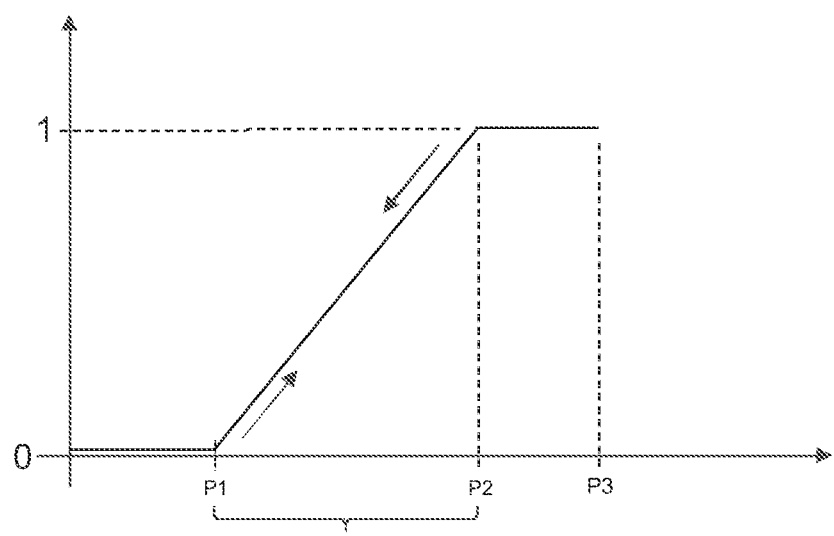
FIG. 3 shows a diagram for illustrating a pressure curve in a pressure chamber upon actuation of the valve unit.

FIG. 3 illustrates an open state of the main valve 28 as a function of a pressure in the pressure chamber 36.

An open state of the main valve 28 is plotted on the vertical axis, the main valve 28 being closed at a value of 0 and being fully open at a value of 1.

A pressure in the pressure chamber 36 is plotted on the longitudinal axis.

At a value P1, in the example embodiment at about 3 bar, the piston 32 moves out of the closed position, and the main valve 28 starts to open.

At a value P2, in the example embodiment between 5.5 and 6 bar, the piston 32 is in its open position, and the main valve 28 is thus fully open.

The value P3 corresponds to a system pressure of about 8 bar.

The pressure in the pressure chamber 36 varies according to the invention between the values P1 and P2 and always remains below the system pressure P3.

The system pressure P3 may be regulated by the compressed-air control unit 22.

In particular, the compressed-air control unit 22 is set up to regulate the system pressure provided by the compressed-air supply 14 on the basis of a pressure prevailing in the pressure chamber 36.

More specifically, the compressed-air control unit 22 is set up to reduce the system pressure if a difference between the system pressure and the pressure P2, at which the piston 32 is in its open position, is relatively large, for example greater than 0.5 bar.

Accordingly, the compressed-air control unit 22 is also adapted to increase the system pressure if the difference between the system pressure and the pressure P2 is relatively small, for example less than 0.5 bar.

The compressed-air control unit 22 is in particular set up so as to regulate a system pressure depending on the required load of the valve units 12.

In this way, it is possible to adapt the system pressure to the pressure conditions prevailing in the pressure chamber 36. More specifically, the provision of an unnecessarily high system pressure is avoided.

The invention claimed is:

1. A pneumatically controlled valve unit having a main valve for controlling a fluid flow of a fluid to be dosed, the valve unit comprising:
a piston shiftably mounted in a valve chamber, operating against a return device, and connected to a valve closing body of the main valve to open and close the main valve,
wherein the piston delimits a pressure chamber within the valve chamber such that the piston can be shifted against the return device by pressurizing the pressure chamber,
wherein a position sensor is provided which is set up to detect the position of the piston in the valve chamber,
wherein one respective pressure line leads from the pressure chamber to a pressure fluid port and a ventilation port, and an aeration valve is arranged in one pressure line and a ventilation valve is arranged in the further pressure line,
wherein a control unit is provided which is set up to switch the aeration valve and the ventilation valve on the basis of the position of the piston detected by the position sensor to regulate a pressure in the pressure chamber for shifting the piston,
wherein the control unit is set up to close the aeration valve or the ventilation valve as soon as the piston is in the open position or in the closed position, and
such that the pressure in the pressure chamber does not rise up to the system pressure of a connected compressed-air network upon opening of the main valve and the pressure in the pressure chamber does not drop to ambient pressure when closing the main valve.

2. The valve unit according to claim 1, wherein a pressure sensor is arranged in the valve chamber.

3. The valve unit according to claim 1, wherein the aeration valve and/or the ventilation valve is a solenoid valve.

4. The valve unit according to claim 1, wherein the valve unit has an electronic interface for reading out data including a position of the piston and/or a pressure in the pressure chamber.

5. The valve unit according to claim 1, wherein the valve unit includes a chamber separate from the valve chamber for accommodating the electronic components.

6. A valve system comprising at least one valve unit according to claim 1, the valve system comprising a compressed-air supply which is connected to the pressure fluid port of the at least one valve unit, and a compressed-air control unit which is set up so as to regulate a system pressure provided by the compressed-air supply on the basis of a position of the piston and/or a pressure prevailing in the pressure chamber.

7. The valve system according to claim 6, comprising a valve unit, wherein the compressed-air control unit is electronically connected to an interface of the valve unit for reading out data.

8. A method of operating a valve unit according to claim 1, comprising:
controlling, via the control unit, the aeration valve and/or the ventilation valve to shift the piston from an open position, in which the main valve is open, to a closed position, in which the main valve is closed, or vice versa,
detecting the position of the piston by the position sensor, and
closing the aeration valve or the ventilation valve as soon as the piston is in the open position or in the closed position such that the pressure in the pressure chamber does not rise up to the system pressure of a connected compressed-air network upon opening of the main valve and the pressure in the pressure chamber does not drop to ambient pressure when closing the main valve.

9. The method according to claim 8, wherein the aeration valve or the ventilation valve is temporarily reopened if the position of the piston differs from an open position or a closed position, while the pressure in the pressure chamber remains approximately constant.

10. A pneumatically controlled valve unit having a main valve for controlling a fluid flow of a fluid to be dosed, comprising:
a piston shiftably mounted in a valve chamber, operating against a return means, and connected to a valve closing body of the main valve to open and close the main valve,
wherein the piston delimits a pressure chamber within the valve chamber such that the piston can be shifted against the return means by pressurizing the pressure chamber,
wherein a position sensor is provided which is set up to detect the position of the piston in the valve chamber,
wherein one respective pressure line leads from the pressure chamber to a pressure fluid port and a ventilation port, and an aeration valve is arranged in one pressure line and a ventilation valve is arranged in the further pressure line,
wherein a control unit is provided which is set up to switch the aeration valve and the ventilation valve on the basis of the position of the piston detected by the position sensor to regulate a pressure in the pressure chamber for shifting the piston, and
wherein the control unit is set up to switch the aeration valve or the ventilation valve already when the piston is not yet in a final position, but the measured pressure is sufficient to shift the piston further up to the final position against the force of the return means.

* * * * *